US011490465B2

(12) United States Patent
Sitterlet et al.

(10) Patent No.: US 11,490,465 B2
(45) Date of Patent: Nov. 1, 2022

(54) WINDOW ASSEMBLY HAVING A TERMINAL CONNECTOR

(71) Applicant: PILKINGTON GROUP LIMITED, Lathom (GB)

(72) Inventors: Charles P. Sitterlet, Northwood, OH (US); Charles E. Ash, Canton, OH (US); Robert Matt Thomas, Sylvania, OH (US); Thomas S. Hicks, Allen, MI (US)

(73) Assignee: Pilkington Group Limited, Lathom (GB)

( * ) Notice: Subject to any disclaimer, the term of this patent is extended or adjusted under 35 U.S.C. 154(b) by 351 days.

(21) Appl. No.: 16/488,643

(22) PCT Filed: Feb. 28, 2018

(86) PCT No.: PCT/GB2018/050523
§ 371 (c)(1),
(2) Date: Aug. 26, 2019

(87) PCT Pub. No.: WO2018/158574
PCT Pub. Date: Sep. 7, 2018

(65) Prior Publication Data
US 2020/0045780 A1 Feb. 6, 2020

Related U.S. Application Data

(60) Provisional application No. 62/466,171, filed on Mar. 2, 2017.

(51) Int. Cl.
*H05B 3/84* (2006.01)
*B60S 1/02* (2006.01)

(52) U.S. Cl.
CPC ............... *H05B 3/84* (2013.01); *B60S 1/026* (2013.01); *H05B 2203/016* (2013.01)

(58) Field of Classification Search
CPC ... H05B 3/84; H05B 3/86; H05B 3/03; H05B 3/16; H05B 3/18; H05B 2203/016;
(Continued)

(56) References Cited

U.S. PATENT DOCUMENTS 3,579,243 A * 5/1971 Dickason ............. H01Q 1/1271
343/906
3,813,519 A * 5/1974 Jochim ................ H01C 17/16
338/217
(Continued)

FOREIGN PATENT DOCUMENTS

EP 0488878 A1 1/1996
JP S5853372 U 4/1983

OTHER PUBLICATIONS

European Patent Office, International Search Report with Written Opinion, which issued in PCT/GB2018/050523, dated May 7, 2018, 13 pages, European Patent Office, Rijswijk, Netherlands.

*Primary Examiner* — Shawntina T Fuqua
(74) *Attorney, Agent, or Firm* — Marshall & Melhorn, LLC

(57) ABSTRACT

A window assembly includes a first pane of glass and a first terminal connector in mechanical communication with the first pane of glass. The first terminal connector has a first base portion which includes a first surface. The first surface is separated from the first pane of glass by solder. The first surface includes a center portion. The center portion includes a curved portion which is nearer the major surface of the first pane of glass than a remaining portion of the center portion. The solder separating the curved portion from the major surface of the first pane of glass is of a thickness which is less than a thickness of the solder separating the remaining portion of the center portion.

19 Claims, 8 Drawing Sheets

(58) Field of Classification Search
CPC ........ H05B 2203/031; H05B 2203/011; H05B 2214/02; B60S 1/026
See application file for complete search history.

(56) References Cited

U.S. PATENT DOCUMENTS

| | | |
|---|---|---|
| 9,837,727 B2 | 12/2017 | Schmalbuch et al. |
| 10,297,929 B2 | 5/2019 | Schmalbuch et al. |
| 10,305,239 B2 | 5/2019 | Degen et al. |
| 2009/0277671 A1 | 11/2009 | Hahn |
| 2015/0236431 A1* | 8/2015 | Schmalbuch .......... H01R 12/57 174/250 |
| 2016/0107613 A9 | 4/2016 | Sitterlet |
| 2018/0079379 A1* | 3/2018 | Snider ...................... B60J 10/70 |
| 2018/0254570 A1* | 9/2018 | Terashima ............. H01R 13/15 |
| 2021/0028571 A1* | 1/2021 | Kitade ............... H01R 12/7076 |

* cited by examiner

WINDOW ASSEMBLY HAVING A TERMINAL CONNECTOR

CROSS-REFERENCE TO RELATED APPLICATION

This application is claiming the benefit, under 35 U.S.C. 119(e), of the provisional U.S. patent application which was granted Ser. No. 62/466,171 and filed on Mar. 2, 2017, the entire disclosure of which is hereby incorporated by reference.

BACKGROUND

The invention relates to a window assembly. More particularly, the invention relates to a window assembly comprising a terminal connector.

The windows of a vehicle are a prominent feature of the overall design of the vehicle. Increasingly, the front window or windshield is a location on which an ever-expanding variety of electronic equipment and other devices are disposed. Typically, electricity must be reliably supplied to the equipment and devices disposed on the windshield to power the aforementioned items.

Terminal connectors are often used to supply the electricity, as in US20090277671A1 (Hahn). However, after the terminal connectors known in the art are attached to the windshield, the windshield can experience damage such as, for example, glass breakage and spalling. This type of damage can lead to windshield failure or failure of the items disposed thereon. Thus, it would be desirable to provide a windshield which allows electrical power to be supplied to, for example, a heated wiper rest area that is not damaged by the terminal connector attached thereto.

BRIEF SUMMARY (1) Embodiments of a window assembly are provided. In an embodiment, the window assembly comprises a first pane of glass and a first terminal connector in mechanical communication with the first pane of glass. The first terminal connector has a first base portion that comprises a first surface which faces a major surface of the first pane of glass. The first surface is separated from the major surface of the first pane of glass by solder and comprises a center portion provided between a first edge portion and a second edge portion. The center portion is nearer the major surface of the first pane of glass than the first edge portion and the second edge portion and comprises a curved portion which is nearer the major surface of the first pane of glass than a remaining portion of the center portion. The solder separating the curved portion from the major surface of the first pane of glass is of a thickness which is less than a thickness of the solder separating the remaining portion of the center portion from the major surface of the first pane of glass.

(2) Preferably, the first edge portion and the second edge portion are each provided in an oblique relationship with the major surface of the first pane of glass.

(3) Preferably, the first edge portion extends from an edge of the first surface to the center portion and the second edge portion extends from an opposite edge of the first surface to the center portion, wherein the first edge portion and the second edge portion are each sloped with respect to the major surface of the first pane of glass.

(4) Preferably, the solder separating the first edge portion and the second edge portion from the major surface of the first pane of glass is of a thickness which is greater than a thickness of the solder separating the center portion from the major surface of the first pane of glass.

(5) Preferably, the center portion extends from an edge of the first surface to an opposite edge of the first surface.

(6) Preferably, the curved portion is the portion of the first surface which is closest to the major surface of the first pane of glass.

(7) Preferably, the solder is lead-free.

(8) Preferably, the curved portion comprises a radius of curvature of 6.0-25.4 mm.

(9) Preferably, the curved portion extends in a direction which is generally parallel to a portion of the lower edge of the first pane of glass.

(10) Preferably, the center portion separates the first edge portion from the second edge portion.

(11) Preferably, the window assembly further comprises a second terminal connector which is in a spaced apart relationship with the first terminal connector.

(12) Preferably, the first terminal connector is in a spaced apart and parallel relationship with a portion of the lower edge of the first pane of glass.

(13) Preferably the window assembly further comprises a wire assembly which includes a conductive wire having a portion covered by an insulating sheath and an exposed portion, which is not covered by the insulating sheath, the first terminal connector being attached to the exposed portion.

(14) Preferably the first terminal connector is of a thickness (T) of 2 mm or less, a length (L) of 6 mm or less, and a width (W) of 6 mm or less.

(15) Preferably the window assembly further comprises a retaining member disposed around a potting layer, which is provided over the first terminal connector, and a polymeric interlayer provided between the first pane of glass and a second pane of glass, wherein a busbar is disposed on the major surface of the first pane of glass and the first terminal connector is in electrical communication with the busbar via the solder.

(16) Preferably the first terminal connector is provided in mechanical communication with the first pane of glass via resistance soldering.

(17) Preferably the first pane of glass and the second pane of glass are each of a thickness of 3 mm or less.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION

Figure 1:
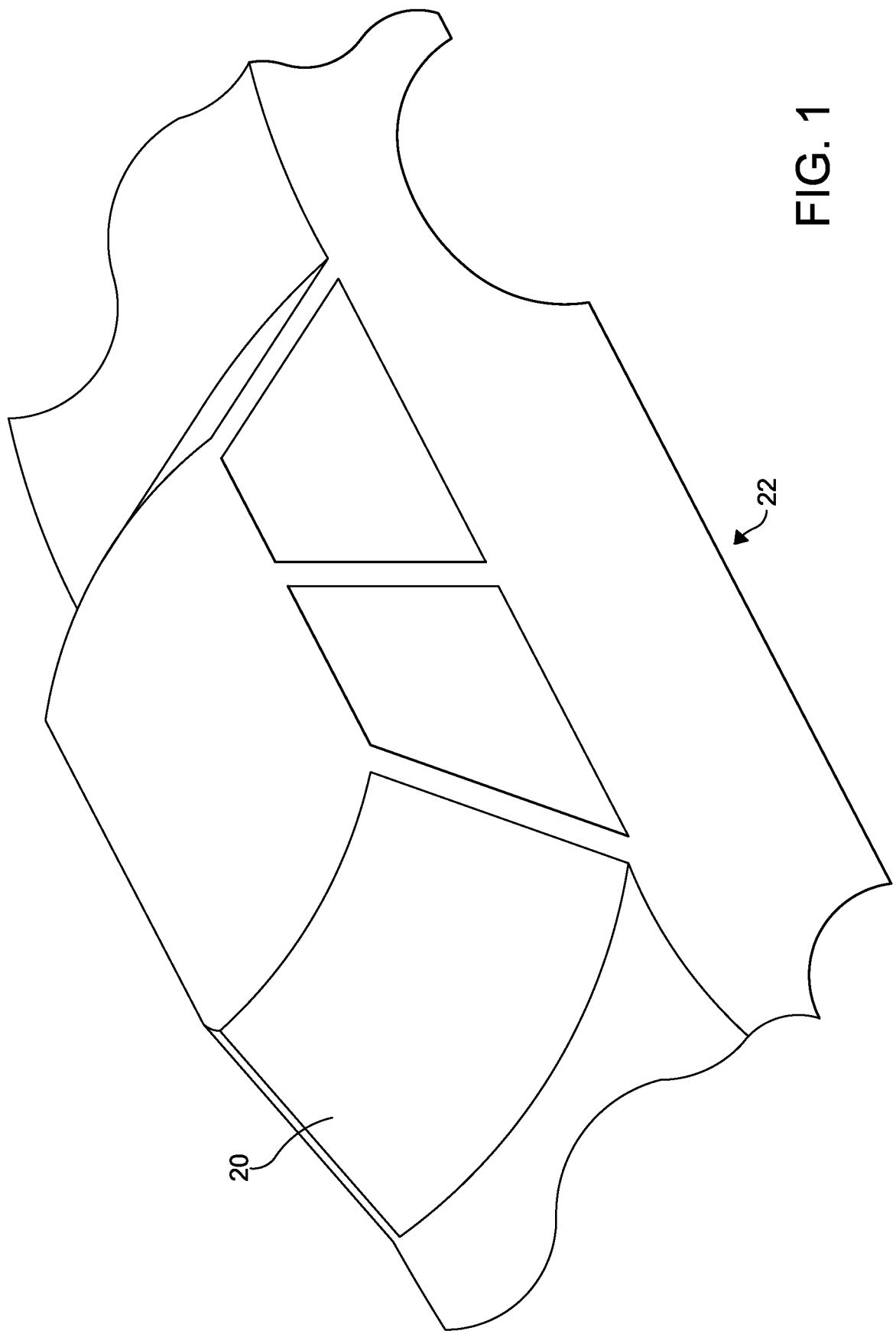
FIG. 1 is a partial perspective view of a vehicle depicting a window assembly in accordance with the invention.

It is to be understood that the invention may assume various alternative orientations and step sequences, except where expressly specified to the contrary. It is also to be understood that the specific articles, assemblies and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Referring now to the figures, a window assembly 20 is illustrated in FIG. 1. The window assembly 20 will be described in connection with a vehicle 22. It would be understood by one of ordinary skill in the art that the window assembly described herein may have applications to on-highway and off-highway vehicles. Furthermore, it would be understood by one of ordinary skill in the art that the window assembly could have architectural, electronic, industrial, locomotive, naval, aerospace, and other applications.

The window assembly 20 may be installed in any appropriate body opening of the vehicle 22. It is preferred that the window assembly 20 is installed in a body opening 24 so as to be the front window or windshield of the vehicle 12. However, it should be appreciated that the window assembly 20 could have other applications in a vehicle. For example, the window assembly 20 could be utilized in another body opening in the vehicle such as, for example, in a side or rear opening of the vehicle. In these examples, the window assembly 20 is a side lite or a back lite of the vehicle. In another embodiment, the window assembly 20 may be utilized in an opening in the roof of the vehicle. In these embodiments (not depicted), the window assembly may monolithic. Such a single glass sheet may be tempered. In other embodiments, the window assembly 20 may be laminated.

The window assembly 20 may comprise a polymeric interlayer 26 provided between a first pane of glass 28 and a second pane of glass 30. As illustrated in, for example, FIG. 4, the first pane of glass 28 is depicted as the inner pane of glass and the second pane of glass 30 is depicted as the outer pane of glass. However, it should be appreciated that, in other embodiments, the first pane of glass 28 may be the outer pane of glass and the second pane of glass 30 may be the inner pane of glass.

Preferably, the polymeric interlayer 26 is clear and substantially transparent to visible light. Optionally, the polymeric interlayer 26 can be tinted and/or comprise an IR reflective film to provide additional solar control features. The polymeric interlayer 26 is of or includes a suitable polymer such as, for example, polyvinyl butyral (PVB) or another polymer. In certain embodiments like those shown in FIG. 2 and FIG. 3, the polymeric interlayer 26 is provided as a sheet of material in a shape substantially matched to that of the first pane of glass 28 and second pane of glass 30. In other embodiments (not depicted), the polymeric interlayer is provided in a shape substantially matched to that of the first pane of glass or the second pane of glass.

The polymeric interlayer 26 may be of any suitable thickness. In certain embodiments, the polymeric interlayer 26 has a thickness of between 0.5 and 1.6 millimeters (mm). Preferably, the polymeric interlayer 26 has a thickness of between 0.6 and 0.9 mm. In these embodiments, a typical thickness of the polymeric interlayer 26 is 0.76 mm.

To form the window assembly 20, the first pane of glass 28 and the second pane of glass 30 may be laminated to each other or are otherwise adhered together via the polymeric interlayer 26. Lamination processes known in the art are suitable for adhering the first pane of glass 28 to the second pane of glass 30 via the polymeric interlayer 26 and forming the window assembly 20. Generally, such lamination processes will include providing the polymeric interlayer 26 between the first pane of glass 28 and the second pane of glass 30 and subjecting the polymeric interlayer 26 and panes of glass 28, 30 to a predetermined temperature and pressure to create a laminated window assembly 20.

Figure 2:
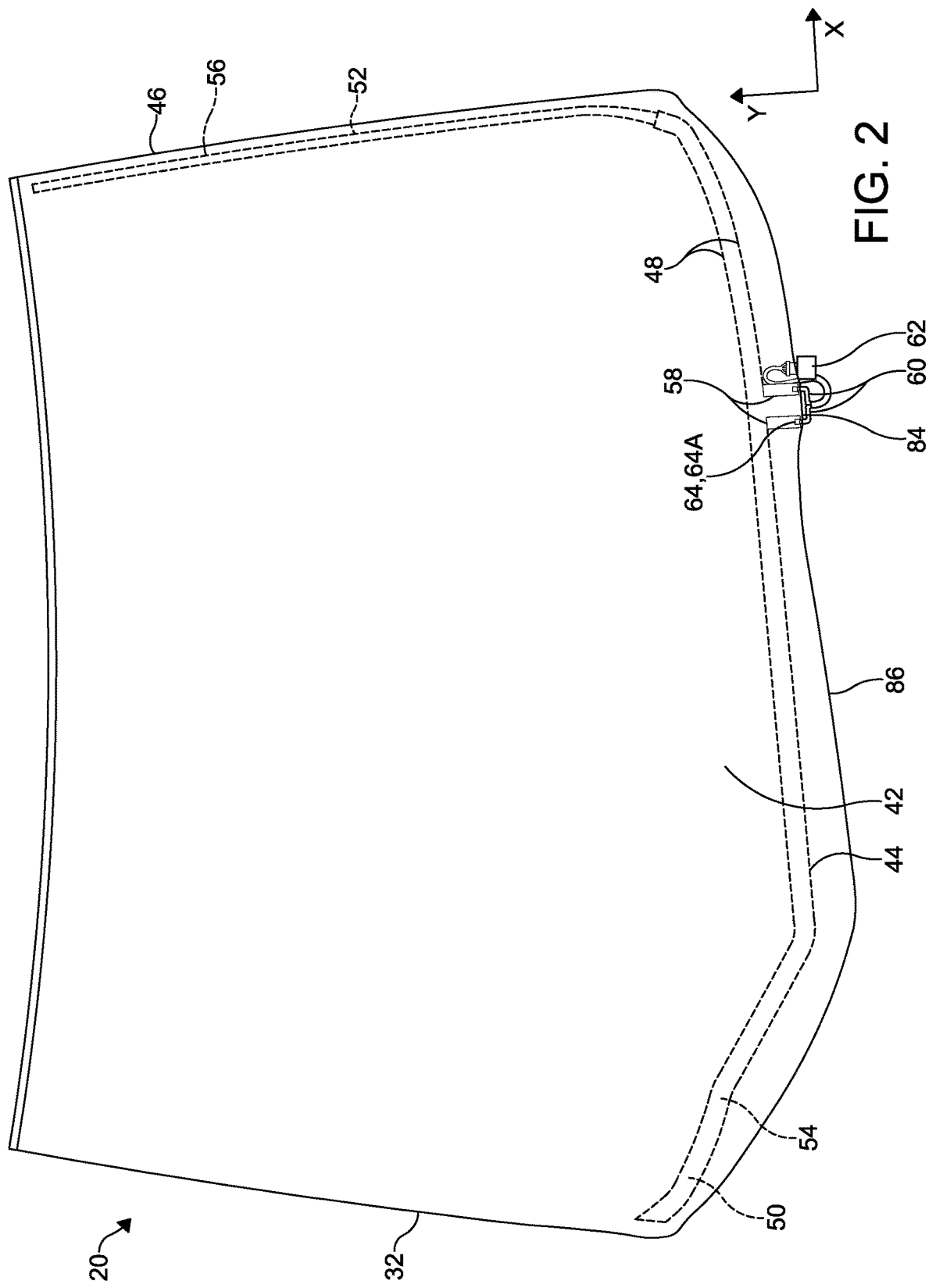
FIG. 2 is a front view of an embodiment of the window assembly of FIG. 1.

The first pane of glass 28 and second pane of glass 30 each have a peripheral edge that defines a peripheral edge 32 of the window assembly 20, which is illustrated in, for example, FIG. 2. As illustrated best in FIG. 4, the first pane of glass 28 and second pane of glass 30 each have a first major surface 34, 36 and a second major surface 38, 40. Preferably, the first major surface 34 of the first pane of glass 28 faces the interior of the vehicle 22. The first major surface 36 of the second pane 30 and the second major surface 38 of the first pane of glass 28 face each other. Also, the second major surface 40 of the second pane of glass 30 faces the exterior environment.

The first pane of glass 28 may be provided as a sheet and formed using a float glass manufacturing process. The first major surface 34 and the second major surface 38 of the first pane of glass 28 are provided in a parallel relationship with each other. The first pane of glass 28 may have a thickness of 6 mm or less. Preferably, the first pane of glass 28 has a thickness of 4 mm or less. More preferably, the first pane of glass 28 has a thickness of 3 mm or less. In an embodiment, the first pane of glass 28 has a thickness of 1.5-2.1 mm. In other embodiments, the first pane of glass 28 has a thickness of 0.5-1.0 mm. In one embodiment, the first pane of glass 28 has a thickness of 0.5-0.8 mm.

The second pane of glass 30 may be provided as a sheet and formed using a float glass manufacturing process. The first major surface 36 and the second major surface 40 of the second pane of glass 30 are provided in a parallel relationship with each other. The second pane of glass 30 may have a thickness of 6 mm or less. Preferably, the second pane of glass 30 has a thickness of 4 mm or less. More preferably, the second pane of glass 30 has a thickness of 3 mm or less. In an embodiment, the second pane of glass 30 has a thickness of 1.5-2.1 mm. In other embodiments, the second pane of glass 30 has a thickness of 0.5-1.0 mm. In one embodiment, the second pane of glass 30 has a thickness of 0.5-0.8 mm.

When installed, the window assembly 20 may be proximate a windshield wiper system (not depicted). The windshield wiper system comprises one or more windshield wipers which clean the window assembly 20 and remove moisture from the assembly to allow the driver of the vehicle to clearly view the roadway ahead. Under certain conditions, the windshield wipers help to keep the window assembly 20 free from ice, slush, and the like. However, under conditions where ice, slush and the like may form, the windshield wipers are susceptible to freezing to, for example, the second major surface 40 of the second pane of glass 30 while in a rest position. Thus, in certain embodiments, it may be desirable to heat a portion of the window assembly 20 where the wipers rest to prevent the wipers from freezing thereto when the wipers are at rest. Also, it has been found to be desirable to heat portions of the window assembly 20 where the wipers deposit ice, slush, and the like after removing the aforementioned from obstructing the view of the driver. The aforementioned portions 42 of the window assembly 20 which are desirable to heat will be referred to hereinafter as the "wiper rest area." In other embodiments (not depicted), it may be desirable to heat another portion of the window assembly 20. For example, it may be desirable to heat an area of the window assembly adjacent a sensor opening in the window assembly to remove moisture thereon. In this example, the sensor opening may be for a camera attached to the window assembly.

The wiper rest area 42 is provided on the second major surface 40 of the second pane of glass 30 and in one or more edge portions 44, 46 of the window assembly 20 so that when the wipers are at rest or when ice, slush or the like is deposited the driver's view is only minimally obstructed. For example, the wiper rest area 42 may comprise a lower edge portion 44 or a side edge portion 46 of the window assembly 20. Preferably, the wiper rest area 42 comprises the side edge portion 46 of the window assembly 20 adjacent the driver's side of the vehicle. In another embodiment, the wiper rest area 42 comprises a plurality of edge portions 44, 46 of the window assembly 20. For example, the wiper rest area 42 may comprise the lower edge portion 44 and side edge portion 46 of the window assembly 20.

Figure 3:
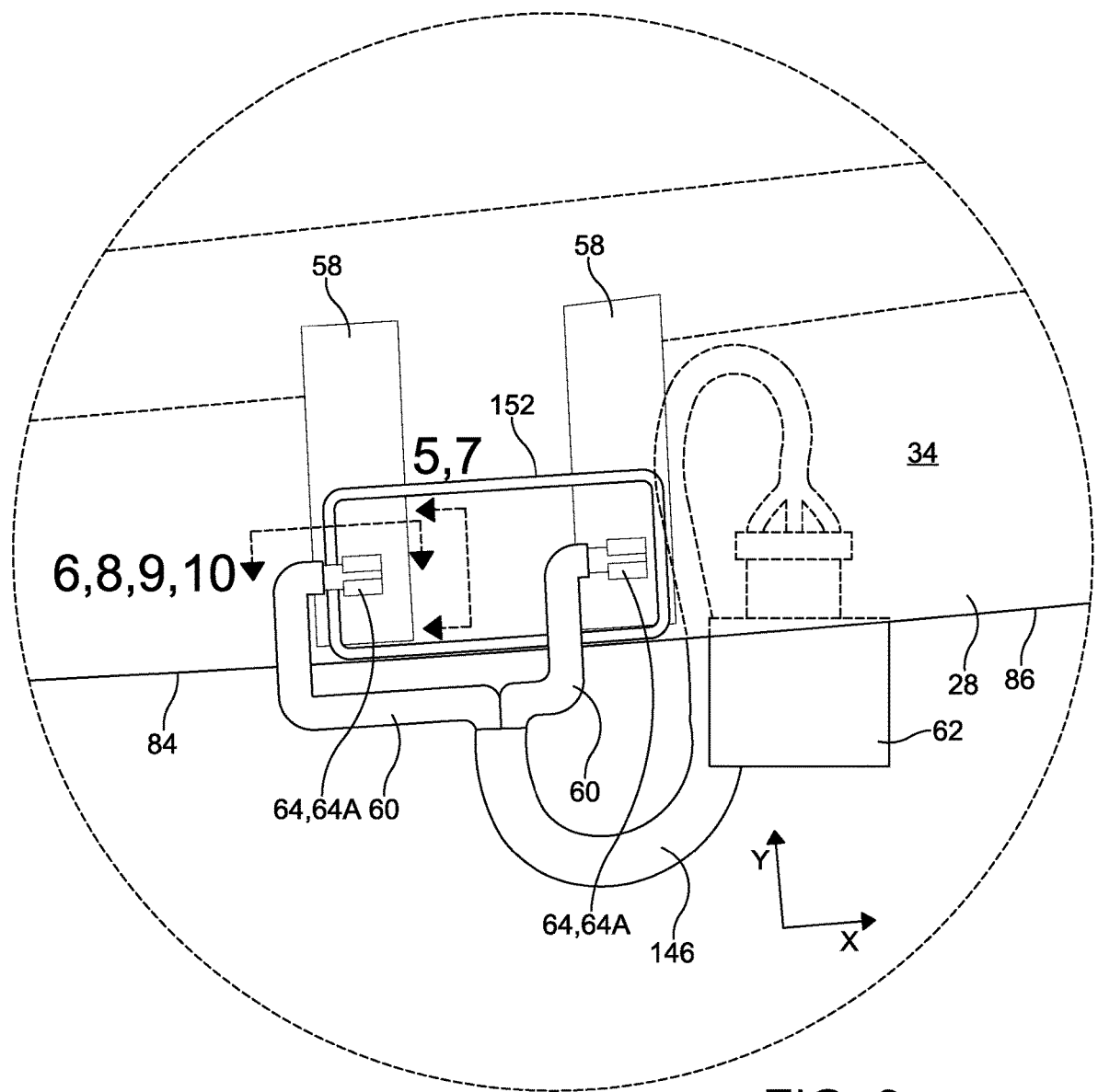
FIG. 3 is a rear view of a portion of another embodiment of the window assembly of FIG. 1.
Figure 4:
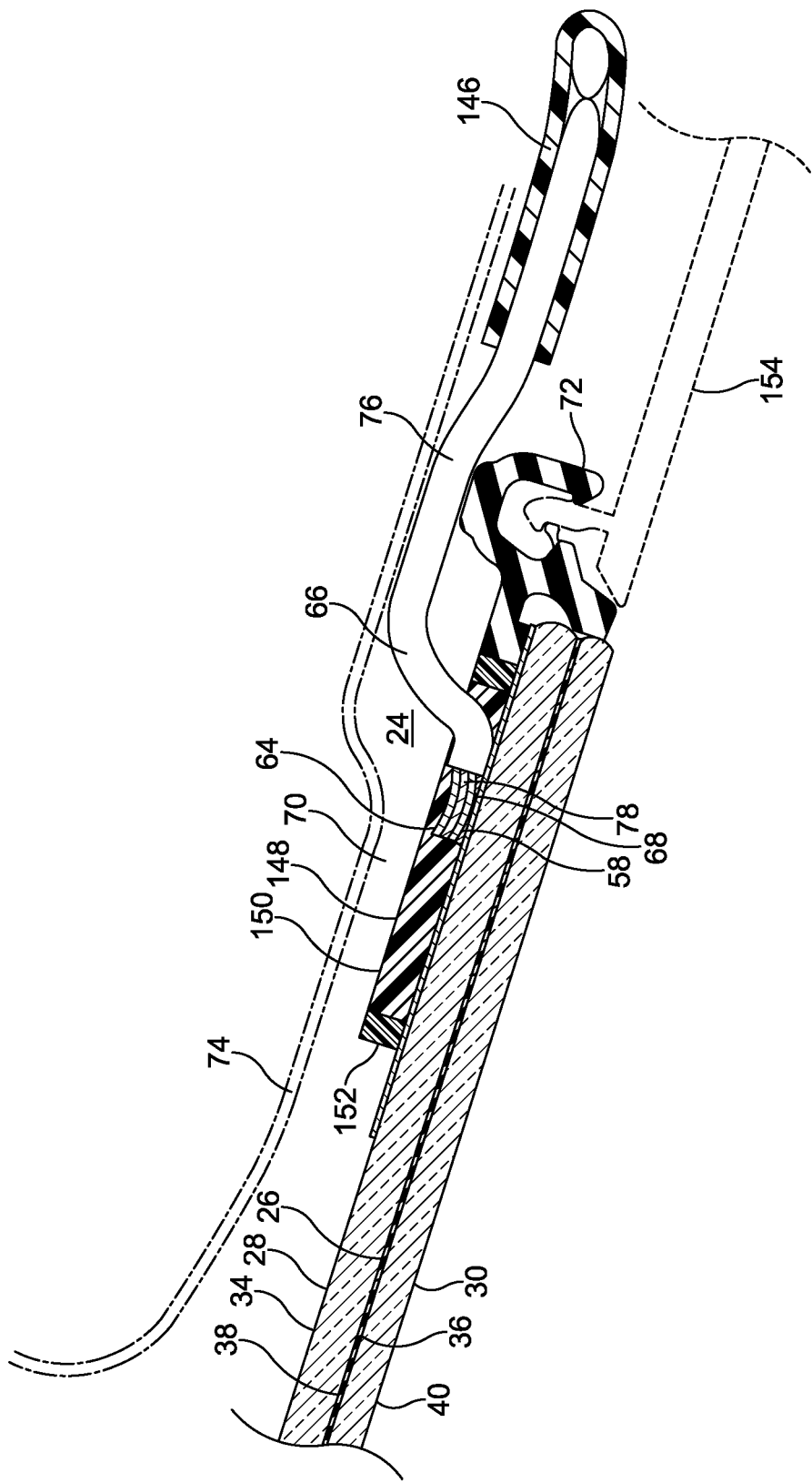
FIG. 4 is a sectional view of a portion of another embodiment of the window assembly of FIG. 1.

Heating of the wiper rest area 42 can be accomplished by any suitable method. It is preferred that heating of the wiper rest area 42 is accomplished by electrical resistance heating. The wiper rest area 42 can be heated by providing electrical resistance heating on any of the major surfaces 34-40 of the first pane of glass 28 or the second pane of glass 30. However, as illustrated in FIGS. 2-4, it may be preferred to heat the wiper rest area 42 by providing electrical resistance heating on the first major surface 34 of the of the first pane of glass 28.

Preferably, electrical resistance heating of the wiper rest area 42 is achieved by providing one or more electrically conductive traces 48 adjacent the wiper rest area 42. The conductive traces 48 may be provided on one of the major surfaces 34-40 of the first pane of glass 28 or the second pane of glass 30 and extend along one or more edge portions 50, 52 of either the first pane of glass 28 or the second pane of glass 30. For example, the conductive traces 48 may extend along a lower edge portion 50 of the first pane of glass 28 or the second pane of glass 30 or along a driver's side edge portion 52 of the first pane of glass 28 or the second pane of glass 30. In another embodiment (not depicted), conductive traces may also extend along a passenger's side edge portion of the first pane of glass or the second pane of glass. Preferably, the conductive traces 48 extend along at least both the lower edge portion 50 and driver's side edge portion 52 of the first pane of glass 28 or the second pane of glass 30.

The conductive traces 48 can be formed by a printing process. However, other processes may be utilized to form the conductive traces 48 and are suitable for use in forming the window assembly 20. Such processes include deletion, sputtering, or silk-screening processes or the like. The conductive traces 48 can be formed from any material which promotes electrical conductance and has an electrical resistance so as to generate heat. For example, the conductive traces 48 may be formed from a silver-containing ceramic frit.

The number of conductive traces 48 provided can vary depending on the amount of heating that is desired and the size of the wiper rest area 42. Preferably, the conductive traces 48 are spaced apart from each other and are provided in a grid-like pattern 54, 56. Depending on the size of the wiper rest area 42, a plurality of grid-like patterns may be provided. For example, as shown in FIG. 2, two grid-like patterns 54, 56 are provided to heat the wiper rest area 42.

The conductive traces 48 are in electrical communication with a busbar 58. In certain embodiments, the conductive traces 48 may be employed in series. However, in other embodiments, the conductive traces may be employed in parallel. Each busbar 58 may be provided in a generally perpendicular relationship and formed in a unitary manner with one or more conductive traces 48.

Each busbar 58 is electrically conductive. The busbars 58 can be formed in any manner and from any material which promotes electrical conductance. In certain embodiments, the busbars 58 are formed by the same process and from the same material utilized to form the conductive traces 48. For example, the busbars 58 may be formed by a printing process and from a silver-containing ceramic frit.

As illustrated in FIG. 2, a plurality of busbars 58 may be provided on the window assembly 20. To promote electrical communication between the busbars 58 and the conductive traces 48, the busbars 58 are provided on the same major surface of the first pane of glass 28 or the second pane of glass 30 that the conductive traces 48 are provided on. Preferably, the busbars 58 and the conductive traces 48 are provided on the first major surface 34, 36 of one of the first pane of glass 28 and the second pane of glass 30. In an embodiment (not depicted), two busbars are provided on the first major surface of the second pane of glass. Alternatively, as shown, for example, in FIGS. 2-4, the busbars 58 may be disposed on the first major surface 34 of the first pane of glass 28. In some embodiments (not depicted), three busbars may be provided. In one such embodiment, a center busbar may be located between two outer busbars. In other embodiments, as is illustrated best in FIG. 2 and FIG. 3, only two busbars 58 are provided. In one such embodiment, a first busbar may be provided in electrical communication with conductive traces along a lower edge portion 50 of the first pane of glass 28 and a second busbar may be provided in electrical communication with conductive traces along a driver's side edge portion 52 of the first pane of glass 28. In another such embodiment (not depicted), a first busbar and a second busbar may be provided in electrical communication with conductive traces along a driver's side edge portion of the first pane of glass.

Preferably, the busbars 58 are provided in a spaced apart and parallel relationship with each other. The busbars 58 may be in electrical communication with each other in, for example, a series circuit via the grid-like patterns 54, 56 of the conductive traces 48.

Each busbar 58 receives electrical power. In the embodiments illustrated, each busbar 58 is in electrical communication with a terminal connector 64, 64A, 64B to receive electrical power. The terminal connector 64, 64A, 64B is in electrical communication with the busbar 58 via solder 68. Also, the terminal connector 64, 64A, 64B is in mechanical communication with or secured to a pane of glass 28, 30 via the solder 68. It should be appreciated that the terminal connector 64, 64A, 64B is in mechanical communication with the pane of glass 28, 30 even though, as illustrated, a busbar 58 is provided between the terminal connector 64, 64A, 64B and the pane of glass 28, 30.

The terminal connector 64, 64A may be provided as a portion of a wire assembly 60. Each wire assembly 60 may be in electrical communication with a wire connector 62. The wire connector 62 allows a supply (not depicted) of electrical power to be communicated to each wire assembly 60. In other embodiments, the terminal connector 64B is in electrical communication with a female connector (not depicted) provided on the vehicle to provide power to a busbar 58. Also, it should be appreciated that other members and methods for communicating electrical power to the terminal connector 64, 64A, 64B can be utilized.

As illustrated best in FIG. 4, each wire assembly 60 comprises a conductive wire 66. The terminal connector 64, 64A is attached to the conductive wire 66. On an end, each wire assembly 60 via the conductive wire 66 is in electrical communication with the wire connector 62. On an opposite end, each wire assembly 60 via the terminal connector 64, 64A and solder 68 is in electrical communication with a busbar 58. Electrical power may be communicated from the supply to the wire connector 62 and from the wire connector 62 to each wire assembly 60. In an embodiment, electrical power is communicated from the wire assembly 60 via the conductive wire 66 and terminal connector 64, 64A to the busbar 58 through the solder 68. From the busbars 58, power is communicated to the conductive traces 48 to heat the wiper rest area 42 to a desired temperature.

Preferably, each conductive wire 66 is flexible to allow the wire assembly 60 to extend in and through a space 70 that remains after installation of the window assembly 20 in the body opening 24 of the vehicle 22. For example, as shown in FIG. 4, the conductive wire 66 may extend in and through the space 70 around a molding member 72. In these embodiments, each conductive wire 66 separates a portion of the molding member 72 from sheet metal 74 which at least partially defines the body opening 24.

Preferably, a portion of each conductive wire 66 is covered by an insulating sheath 76. The insulating sheath 76 prevents the conductive wire 66 from communicating electrical power to an undesired portion of the vehicle 22 such as an electrically conductive portion of the vehicle adjacent the window assembly 20. A portion of the vehicle which is undesirable to communicate electrical power to and is adjacent the window assembly 20 after installation is, for example, the sheet metal 74 which at least partially defines the vehicle body opening 24.

An unsheathed or exposed portion 78 of each conductive wire 66 is attached in a robust manner to the terminal connector 64, 64A adjacent an end of the conductive wire 66. In certain embodiments, the terminal connector 64 is attached to the exposed portion 78 of the conductive wire 66 mechanically such as, for example, by a crimping process. In other embodiments, like the one illustrated in FIG. 11, the exposed portion 78 of the conductive wire 66 is attached to a female-ended portion 80 of the terminal connector 64A. Other methods of attaching a terminal connector 64, 64A to the exposed portion 78 of the conductive wire 66 may be utilized to form the wire assemblies 60. In still other embodiments, like the one illustrated in FIG. 12, the terminal connector 64B may comprise a male-ended connector 82 which connects to the female connector of the vehicle.

As illustrated in, for example, FIG. 2 and FIG. 3, the window assembly 20 may comprise a first terminal connector 64, 64A, 64B and a second terminal connector 64, 64A, 64B. Preferably, the first terminal connector 64, 64A, 64B and the second terminal connector 64, 64A, 64B are substantially similar having substantially similar portions and features. The first terminal connector 64, 64A, 64B may be oriented in various manners with respect to the second terminal connector 64, 64A, 64B and vice versa. Preferably, the first terminal connector 64, 64A, 64B and the second terminal connector 64, 64A, 64B are in a spaced apart relationship with each other. In certain embodiments, the first terminal connector 64, 64A, 64B and the second terminal connector 64, 64A, 64B may be provided in a parallel relationship with each other.

Also, the first terminal connector 64, 64A, 64B and/or the second terminal connector 64, 64A, 64B may be provided in various orientations with respect to one or more portions of the first pane of glass 28 or the second pane of glass 30. For example, in an embodiment, the first terminal connector 64, 64A, 64B is oriented in a parallel and spaced apart relationship with a portion 84 of the lower edge 86 of the first pane of glass 28. In other embodiments, each terminal connector 64, 64A, 64B is oriented in a parallel and spaced apart relationship with a portion 84 of the lower edge 86 of the first pane of glass 28. In this example and due to the orientation of each terminal connector 64 in FIG. 2, a portion of each conductive wire 66 extends in a Y direction and is oriented in a generally perpendicular relationship with a portion 84 of the lower edge 86. An alternative embodiment is illustrated in FIG. 3, where the first terminal connector 64, 64A and the second terminal connector 64, 64A are each oriented 90 degrees from their respective orientations in FIG. 2. In this embodiment and due to the orientation of each terminal connector 64,64A, a portion of each conductive wire 66 is extends in an X direction and is in a generally parallel relationship with a portion 84 of the lower edge 86 of the first pane of glass 28. Also, in this embodiment, the portion of each conductive wire 66 that extends over the lower edge 86 of the first pane of glass 28 extends in the Y direction and is oriented in a generally perpendicular or oblique relationship with the portion 84 of the lower edge 86.

When the window assembly 20 comprises two or more terminal connectors 64, 64A, 64B, it is preferred that the two or more terminal connectors 64, 64A, 64B are substantially similar having substantially similar portions and features. Thus, only one terminal connector 64, 64A, 64B will be described below. Furthermore, although the embodiments of the terminal connector 64, 64A, 64B will be described for use in communicating electrical power to heat a wiper rest area 42, it should be appreciated that the terminal connector 64, 64A, 64B may be utilized in other applications. For example, the terminal connector 64, 64A, 64B could also be utilized in an antenna circuit (not depicted) in mechanical communication with a pane of glass 28, 30.

The terminal connector 64, 64A, 64B is formed from a conductive material. Metals are preferred materials for use in the terminal connector 64, 64A, 64B. For example, in an embodiment, the terminal connector 64, 64A, 64B comprises a copper alloy that is coated with a thin layer of nickel.

In certain embodiments, the terminal connector 64, 64A is attached to the end of the conductive wire 66. The terminal connector 64, 64A can be attached to the conductive wire 66 with an adhesive, solder, or via a mechanical method such as, for example, a crimping process. In the embodiments illustrated in FIG. 5 and FIG. 6, the terminal connector 64 has a thickness T, which is determined after the terminal connector 64 has been attached to the conductive wire 66. In some embodiments, the thickness T of the terminal connector 64 is 2 mm or less. However, it is preferred that the thickness T is at least 1.5 mm. Preferably, the terminal connector 64 has a length L, which is measured from an end 88 of the terminal connector 64 that receives the conductive wire 66 to an opposite end 90 of the terminal connector 64. In some embodiments, the terminal connector 64 has a length L of 6 mm or less. However, it is preferred that the length L is at least 4 mm. The terminal connector has a width W, which is measured from a first side 92 to a second side 94 of the terminal connector 64. In some embodiments, the terminal connector 64 has a width W of 6 mm or less. However, it is preferred that the width W is at least 4 mm.

Figure 5:
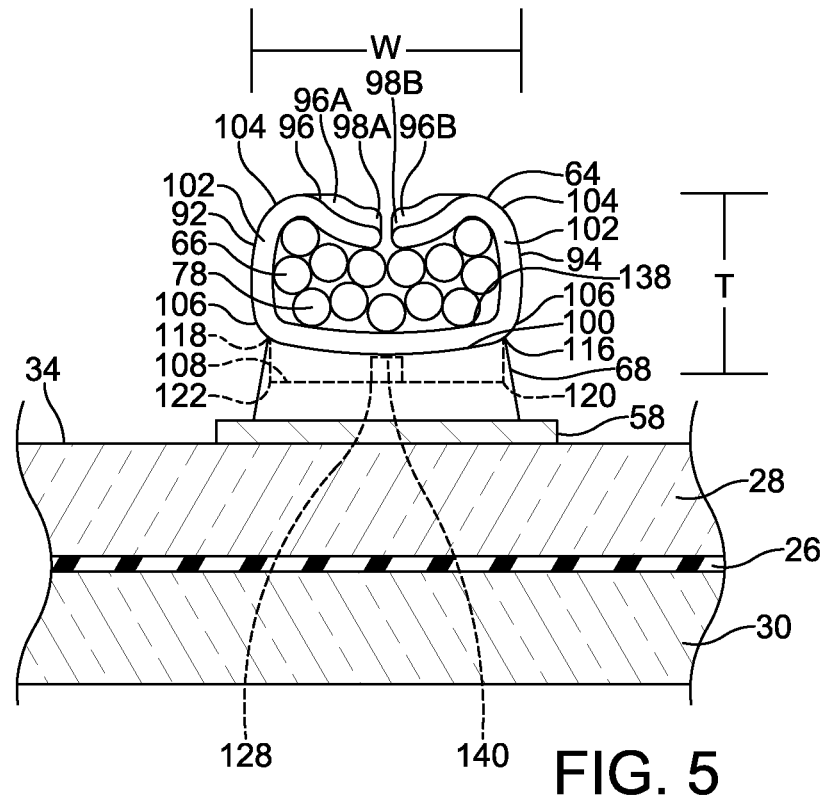
FIG. 5 is a partial sectional view of the window assembly of FIG. 3 view taken along line 5, with the potting layer removed for clarity, depicting an embodiment of a terminal connector.

In certain embodiments, it is preferred that the terminal connector 64, 64A, 64B is formed in a unitary manner. Referring now to FIG. 5, the terminal connector 64 may comprise an upper portion 96. In an embodiment, the upper portion 96 comprises first upper portion member 96A and a second upper portion member 96B. The upper portion members 96A, 96B may be provided in a parallel or generally parallel relationship with each other. In other embodiments, the first upper portion member 96A may be provided at an oblique angle relative to the second upper portion member 96B or vice versa. Each upper portion member 96A, 96B has an end 98A, 98B. In certain embodiments, the member ends 98A, 98B abut each other. In these embodiments, the member ends 98A, 98B may at least partially face each other.

Preferably, the upper portion members 96A, 96B are similar shaped. The shape of the upper portion members 96A, 96B may be determined by the process used to form the terminal connector 64. In an embodiment, the terminal connector 64 may be formed by a stamping process. In another embodiment, the terminal connector 64 may be formed by a progressive die-forming process. As illustrated, the upper portion members 96A, 96B may be configured to provide the upper portion 96 with a concave portion. In this embodiment, the upper portion 96 may be provided in a parallel relationship with a base portion 100. In other embodiments, the upper portion members 96A, 96B may be configured so that the upper portion 96 is generally planar.

Referring back to FIG. 5, each upper portion 96A, 96B is connected to a sidewall 102. The sidewalls 102 define the first side 92 and the second side 94 of the terminal connector 64. Each upper portion member 96A, 96B may be connected to a sidewall 102 via a first rounded portion 104. In certain embodiments, the sidewalls 102 are in a generally parallel relationship with each other. In an embodiment, each sidewall 102 is in a generally perpendicular relationship with the upper portion 96. The exposed portion 78 of the conductive wire 66 separates the sidewalls 102 from each other and the upper portion 96 from the base portion 100.

Each sidewall 102 is connected to the base portion 100. Each sidewall 102 may be connected the base portion 100 via a second rounded portion 106. As described above, in certain embodiments, the upper portion 96 and the base portion 100 may be in a generally parallel relationship with each other. In other embodiments, the upper portion 96 and the base portion 100 are not in a generally parallel relationship with each other.

The base portion 100 comprises a first surface 108. The first surface 108 faces the first major surface 34 of the first pane of glass 28. The first surface 108 is separated from the first major surface 34 of the first pane of glass 28 by the solder 68. The first surface 108 may extend from an end 112 of the base portion 100 to an opposite end 114 of the base portion 100. The ends 112, 114 of the base portion 100 may at least partially define the ends 88, 90 of the terminal connector 64. The first surface 108 may also extend from a side 116 of the base portion 100 to an opposite side 118 of the base portion 100. The sides 116, 118 of the base portion 100 may be provided in a perpendicular relationship with the ends 112, 114 of the base portion 100.

The first surface 108 may comprise four edges 120-126. In this embodiment, the first surface 108 comprises a first edge 120, a second edge 122, a third edge 124, and a fourth edge 126. Preferably, the first edge 120 is in a parallel relationship with the second edge 122 and the third edge 124 is in a parallel relationship with the fourth edge 126. Also, the first edge 120 and the second edge 122 may each be provided in a perpendicular relationship with each of the third edge 124 and the fourth edge 126. Each edge 120-126 may be provided in a parallel or a perpendicular relationship with a portion 84 of the lower edge 86 of the first pane of glass 28.

Figure 9:
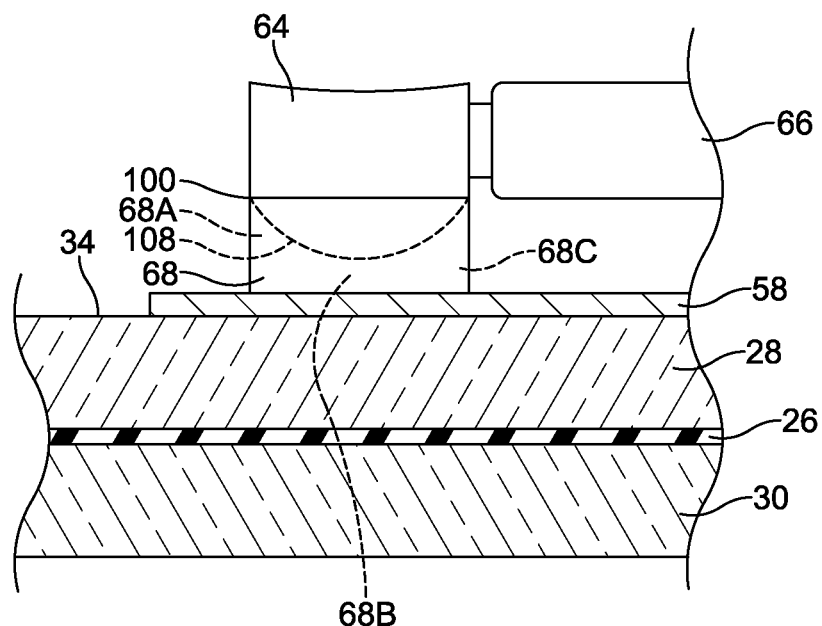
FIG. 9 is a partial sectional view of the window assembly of FIG. 3 view taken along line 9, with the potting layer removed for clarity, depicting yet another embodiment of the terminal connector.
Figure 10:
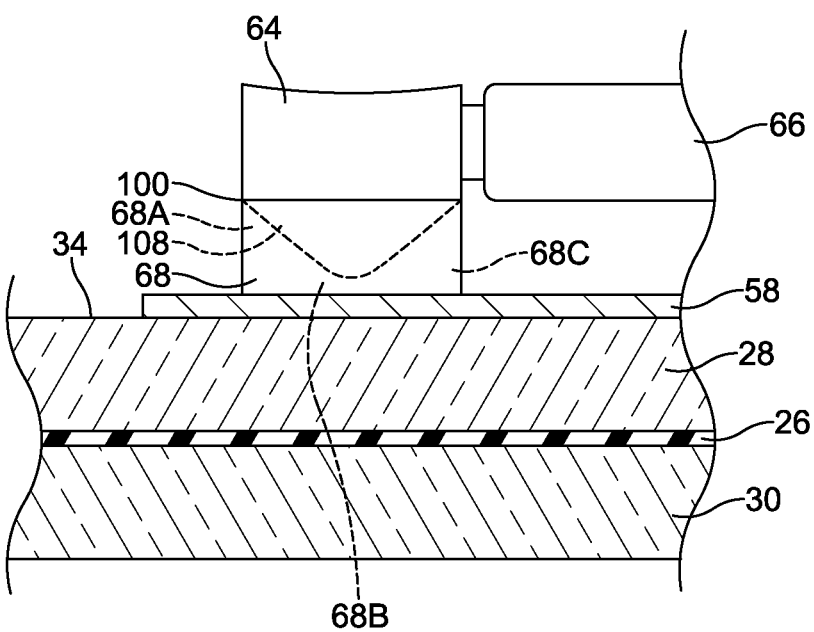
FIG. 10 is a partial sectional view of the window assembly of FIG. 3 view taken along line 10, with the potting layer removed for clarity, depicting still another embodiment of the terminal connector.

The first surface 108 is configured to reduce stress in the first pane of glass 28 when the terminal connector 64 is in electrical communication with a busbar 58 and mechanical communication with the first pane of glass 28. The first surface 108 comprises a curved portion. In certain embodiments, the base portion 100 comprises a curvilinear first surface 108. In one such embodiment, like the one illustrated in FIG. 9, the first surface 108 is rounded. In this embodiment, the rounded first surface 108 extends toward the first pane of glass 28 from the periphery of the base portion 100. In another embodiment, like the one illustrated in FIG. 10, the first surface 108 is conically-shaped. In this embodiment, the conically-shaped first surface 108 extends toward the first pane of glass 28 from the periphery of the base portion 100.

In these embodiments, the first surface 108 comprises a center portion 128. The center portion 128 is nearer the first major surface 34 of the first pane of glass 28 than a first edge portion 130 and a second edge portion 132. Preferably, the center portion 128 is the closest portion of the first surface 108 to the first major surface 34 of the first pane of glass 28. Preferably, the center portion 128 comprises a curved portion 134 which is nearer the first major surface 34 of the first pane of glass 28 than a remaining portion 136 of the center portion 128. Thus, it is preferred that the curved portion 134 is the section of the center portion 128 which is closest to the first major surface 34 of the first pane of glass 28.

Figure 6:
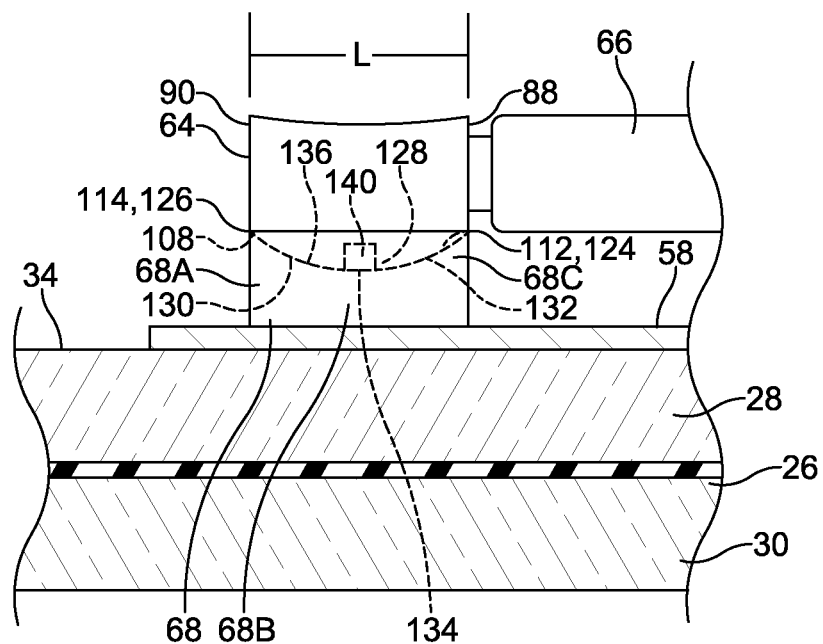
FIG. 6 is a partial sectional view of the window assembly of FIG. 3 taken along line 6 illustrating a side view of the terminal connector of FIG. 5.
Figure 7:
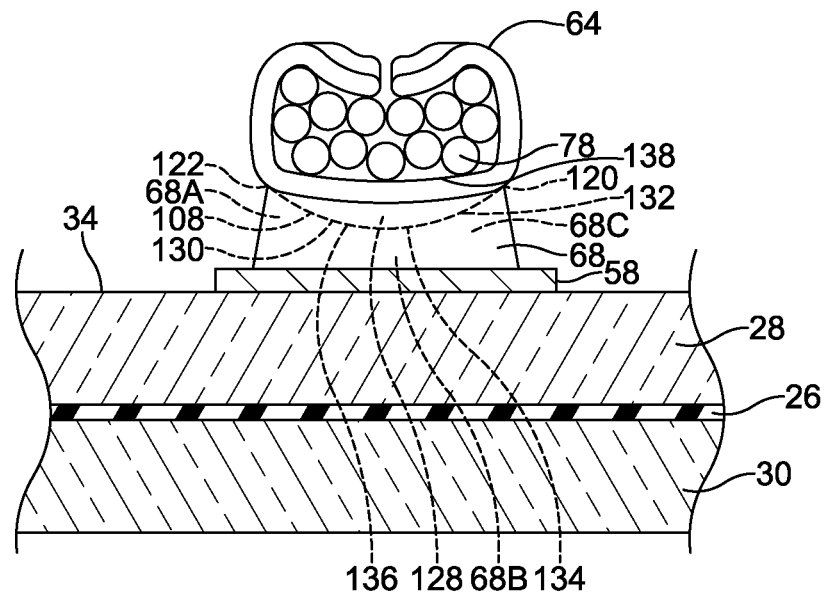
FIG. 7 is a partial sectional view of the window assembly of FIG. 3 view taken along line 7, with the potting layer removed for clarity, depicting another embodiment of the terminal connector.
Figure 8:
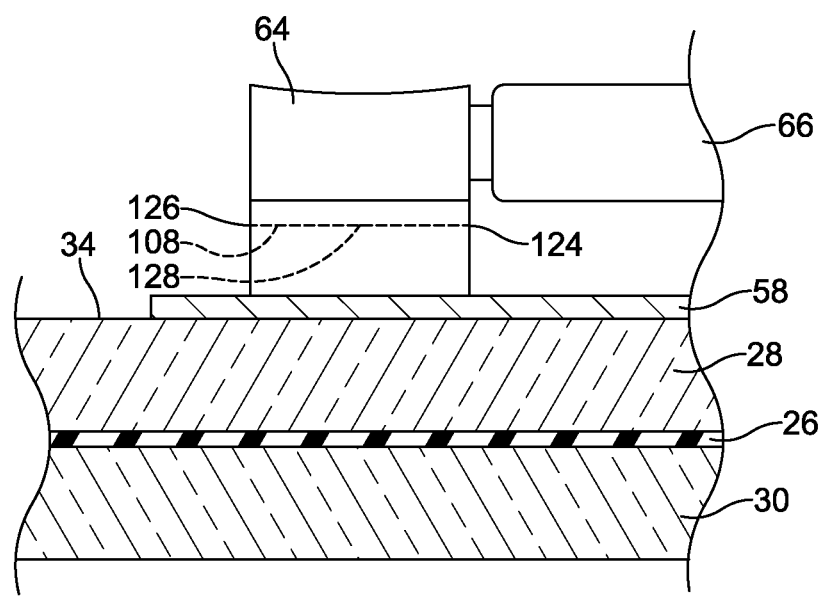
FIG. 8 is a partial sectional view of the window assembly of FIG. 3 taken along line 6 illustrating a side view of the terminal connector of FIG. 7.

In an embodiment, like the one illustrated in FIG. 5 and FIG. 6, the center portion 128 extends in the Y direction and from the first edge 120 of the first surface 108 to the second edge 122 of the first surface 108. In this embodiment, the curved portion 134 is in a perpendicular relationship with the first edge 120 and the second edge 122. Further, the curved portion 134 is in a parallel relationship with the third edge 124 and the fourth edge 126. In these embodiments, the curved portion 134 may extend from the first edge 120 to the second edge 122. Additionally, in this embodiment, the curved portion 134 may be provided in a generally perpendicular relationship with a portion 84 of the lower edge portion 86 of the first pane of glass 34. In another embodiment, like the one illustrated in FIG. 7 and FIG. 8, the center portion 128 extends in the X direction from the third edge 124 of the first surface 108 to the fourth edge 126 of the first surface 108. In this embodiment, the curved portion 134 is in a perpendicular relationship with the third edge 124 and the fourth edge 126. Further, the curved portion 134 is in a parallel relationship with the first edge 120 and the second edge 122. In these embodiments, the curved portion 134 may extend from the third edge 124 to the fourth edge 126. Additionally, in this embodiment, the curved portion 134 may extend in a direction which is general parallel to a portion 84 of the lower edge portion 86 of the first pane of glass 34.

The curved portion 134 comprises a radius of curvature. The radius of curvature is selected to reduce the stress in the first pane of glass 28, which helps to prevent glass breakage and spalling. Preferably, the curved portion 134 comprises a radius of curvature of 6.0-25.4 mm. More preferably, the curved portion 134 comprises a radius of curvature of 12.5 mm. In embodiments where the curved portion 134 extends from the first edge 120 to the second edge 122 of the first surface 108, it is preferred that the radius of curvature of the curved portion 134 adjacent the first edge 120 and the radius of curvature of the curved portion 134 adjacent the second edge 122 are the same. In the embodiments where the curved portion 134 extends from the third edge 124 to the fourth edge 126, it is preferred that the radius of curvature of the curved portion adjacent the third edge 124 and the radius of curvature of the curved portion adjacent the fourth edge 126 are the same.

The remaining portion 136 of the center portion 128 may also be curved and comprise a radius of curvature. For example, the remaining portion 136 may comprise a radius of curvature of 6.0-25.4 mm. In embodiments where the curved portion 134 and the remaining portion 136 each have a radius of curvature, the radius of curvature of the curved portion 134 and the radius of curvature of the remaining portion 136 may be the same. However, in other embodiments, the radius of curvature of the curved portion 134 and the radius of curvature of the remaining portion 136 may be different. For example, in an embodiment, the remaining portion 136 of the center portion 128 has a radius of curvature which is greater than the radius of curvature of the curved portion 134. In other embodiments, the remaining portion 136 of the center portion 128 has a radius of curvature which is less than the radius of curvature of the curved portion 134. In still another embodiment, the remaining portion 136 of the center portion 128 may be planar and have a radius of curvature which is zero.

As illustrated in, for example, FIGS. 5-8, the center portion 128 may separate the first edge portion 130 from the second edge portion 132. However, in other embodiments (not depicted), the first edge portion and the second edge portion may be adjacent each other. In the embodiments illustrated in FIGS. 5-12, the first edge portion 130 extends from an edge 120-126 of the first surface 108 to the center portion 128 and the second edge portion 132 extends from an opposite edge 120-126 of the first surface 108 to the center portion 128. Additionally, in these embodiments, the first edge portion 130 and the second edge portion 132 are provided in a parallel relationship with each other. The first edge portion 130 and the second edge portion 132 may extend in the X direction and the Y direction. In certain embodiments, the first edge portion 130 and the second edge portion 132 each extend in the Y direction from the first edge 120 to the second edge 122. In other embodiments, the first edge portion 130 and the second edge portion 132 each extend in the X direction from the third edge 124 to the fourth edge 126. In some embodiments, the first edge portion 130 and the second edge portion 132 are each provided in an oblique relationship with the first major surface 34 of the pane of glass 28. In one such embodiment, the first edge portion 130 and the second edge portion 132 are each sloped with respect to the first major surface 34 of the pane of glass 28.

One or both of the first edge portion 130 and the second edge portion 132 may be curved and comprise a radius of curvature. The first edge portion 130 and the second edge portion 132 may each comprise a radius of curvature of 6.0-25.4 mm. In embodiments where the first edge portion 130 and the second edge portion 132 each have a radius of curvature, the radius of curvature of the first edge portion 130 and the radius of curvature of the second edge portion 132 may be the same. Additionally, one or both of the first edge portion 130 and the second edge portion 132 may comprise a radius of curvature which is the same as the radius of curvature for the curved portion 134. In other embodiments, one or both of the first edge portion 130 and the second edge portion 132 comprise a radius of curvature which is different than the radius of curvature for the curved portion 134. For example, in one embodiment, one or both of the first edge portion 130 and the second edge portion 132 comprise a radius of curvature which is greater than the radius of curvature of the curved portion 134. In another embodiment, one or both of the first edge portion 130 and the second edge portion 132 comprise a radius of curvature which is less than the radius of curvature of the curved portion 134. In some embodiments, the radius of curvature of the first edge portion 130 and the radius of curvature of the second edge portion 132 may also be different. For example, in an embodiment, the first edge portion 130 has a radius of curvature which is greater than the radius of curvature of the second edge portion 132. In other embodiments, the first edge portion 130 has a radius of curvature which is less than the radius of curvature of the second edge portion 132. In still other embodiments, one or both of the first edge portion 130 and the second edge portion 132 may be planar and have a radius of curvature which is zero.

In certain embodiments, like those illustrated in, for example, FIGS. 5-8, the base portion 100 also comprises a second surface 138. In the embodiments illustrated in FIGS. 5-10, the second surface 138 is in mechanical communication with the exposed portion 78 of the conductive wire 66. Further, as illustrated in FIG. 5 and FIG. 6, an opening 140 may communicate with the first surface 108 and the second surface 138. Providing the opening 140 is advantageous because it allows gases, which are formed during soldering, to escape and for a portion of solder 68 to be disposed within the terminal connector 64, which provides better mechanical communication between the first terminal connector 64 and the first pane of glass 28. More particularly, when the solder 68 is heated during formation of the window assembly 20, solder 68 flows from the first surface 108 through the opening 140 to the second surface 138. Thus, the opening 140 receives a portion of solder 68 and, preferably, the portion of solder 68 extends from the first surface 108 to the second surface 138. Additionally, these embodiments may improve the mechanical communication between the first terminal connector 64 and the conductive wire 66.

Figure 11:
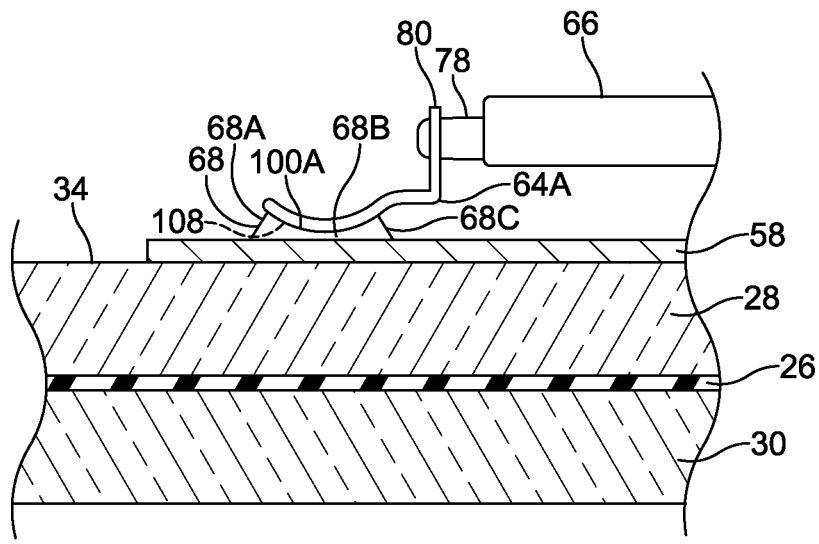
FIG. 11 is a partial sectional view of a window assembly in accordance with the invention, which depicts a further embodiment of the terminal connector.

FIG. 11 illustrates another embodiment of the first terminal connector 64A which is suitable for use in the window assembly 20. In this embodiment, the first terminal connector 64A is formed in a unitary manner. Also, the first terminal connector 64A comprises a first base portion 100A. The first base portion 100A comprises a first surface 108. The first surface 108 can be as described above. As illustrated, the first terminal connector 64A illustrated in FIG. 11 does not include an upper portion and sidewalls.

Figure 12:
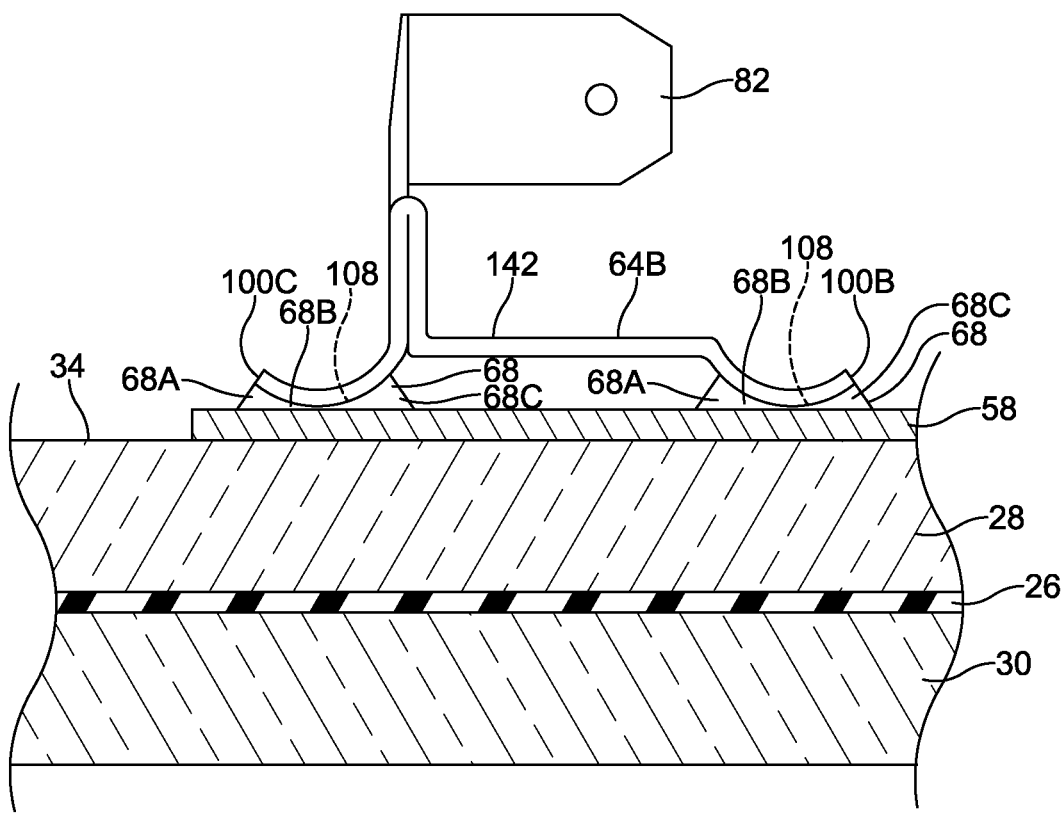
FIG. 12 is a partial sectional view of a window assembly in accordance with the invention, which depicts an additional embodiment of the terminal connector.

FIG. 12 illustrates another embodiment of the first terminal connector 64B which is suitable for use in the window assembly 20. In this embodiment, the first terminal connector 64B comprises a first base portion 100B and a second base portion 100C. Preferably, as illustrated, the base portions 100B, 100C may be similarly configured. Each base portion 100B, 100C comprises a first surface 108. The first surface 108 of each base portion 100B, 100C can be as described above. Each base portion 100B, 100C is attached to and in electrical communication with a body portion 142. In an embodiment, the base portions 100B, 100C may be formed in a unitary manner with the body portion 142. The body portion 142 is attached to and in electrical communication with the male-ended connector 82.

As noted above, the first terminal connector 64, 64A, 64B is in mechanical communication with the first pane of glass 28. Also, the first terminal connector is in electrical communication with a busbar 58. In order to enable mechanical communication between the first terminal connector 64, 64A, 64B and the first pane of glass 28 and electrical communication between the first terminal connector 64, 64A, 64B and a busbar 58, the solder 68 is provided. Unfortunately, the terminal connector configurations known in the art increase the mechanical stress in the first pane of glass when a window assembly is formed. The increased mechanical stress weakens the glass pane and causes glass breakage and spalling. These disadvantages are compounded when the solder utilized is of the lead-free variety because such solders typically are less ductile than solders that include lead. Such decreases in ductility further increase the mechanical stress between the terminal connector and the pane of glass it is in mechanical communication with.

Advantageously, the embodiments described herein maintain the glass strength and eliminate glass breakage and spalling by reducing the stress in the pane of glass even when a lead-free solder is utilized. More particularly, by utilizing the embodiments of the terminal connector 64, 64A, 64B described herein, it is believed that the stress profile in the first pane of glass 28 gradually reduces in the area thereof that is beneath the terminal connector 64, 64A, 64B from the center portion 128 toward the edges 120-126 of the first surface 108. This is in stark contrast to the stress profile in a pane of glass when known terminal connector configurations are utilized, which, in the area beneath the terminal connector, exhibit a sharply defined stress profile adjacent the periphery of such terminal connectors.

Solder compositions known in the art are suitable for use in forming the window assembly 20. As noted above, in certain embodiments, the solder 68 may comprise lead. However, it is preferred that the solder 68 is lead-free, i.e. contains no lead. In embodiments where solder is of the lead-free variety, the solder 68 may comprise indium, tin, silver, copper, zinc, bismuth, and mixtures thereof. In certain embodiments where solder is of the lead-free variety, the solder 68 comprises more indium than any other metal component in the solder. In one such embodiment, the solder 68 comprises 65% indium, 30% tin, 4.5% silver, and 0.5% copper. In other embodiments where the solder is of the lead-free variety, another composition may be utilized.

The window assembly 20 may be formed using a soldering method known in the art. However, in certain embodiments, it is preferred that the window assembly 20 is formed utilizing a resistance soldering method. More particularly, the first terminal connector 64, 64A, 64B is provided in mechanical communication with the first pane of glass 28 via resistance soldering. Also, in this embodiment, the first terminal connector 64, 64A, 64B is provided in electrical communication with a busbar 58 via resistance soldering.

Referring back to FIG. 5 and FIG. 6, after forming the window assembly 20, the solder 68, 68A, 68B, 68C is positioned between the first terminal connector 64, 64A, 64B and the first major surface 34 of the first pane of glass 28. More particularly, the base portion 100, 100A, 100B, 100C is separated from the first major surface of the first pane of glass 28 by the solder 68, 68A, 68B, 68C. It is preferred that the first surface 108 does not contact the first pane of glass 28. Thus, in an embodiment, the solder 68, 68A, 68B, 68C is provided between each portion 128-132 of the first surface 108 and the first major surface 34 of the first pane of glass 28. Preferably, the thickness of the solder 68, 68A, 68B, 68C separating the first surface 108 from the first pane of glass 28 is greatest between one or both of the first edge portion 130 and the first major surface 34 of the first pane of glass 28 and the second edge portion 132 and the first major surface 34 of the first pane of glass 28. In one such embodiment, the solder 68A, 68C separating the first edge portion 130 and the second edge portion 132 from the first major surface 34 of the first pane of glass 28 is of a thickness which is greater than a thickness of the solder 68B separating the center portion 128 from the first major surface 34 of the first pane of glass 28. As illustrated, the thickness of the solder 68 may gradually increase from the center portion 128 in a direction toward one or more of the first edge portion 130 and the second edge portion 132. In some embodiments, the thickness of the solder 68 gradually increases from the center portion 128 to one or both of the first edge portion 130 and the second edge portion 132. Additionally, the solder 68B separating the curved portion 134 from the first major surface 34 of the first pane of glass 28 is of a thickness which is less than a thickness of the solder 68B separating the remaining portion 136 of the center portion 128 from the first major surface 34 of the first pane of glass 28.

Referring back to FIG. 4, in certain embodiments, a cylindrical tube member 146 may be disposed around the wire assemblies 60 to maintain the spacing and orientation of the conductive wires 66 relative to each other. The cylindrical tube member 146 is provided between and spaced apart from the wire connector 62 and the terminal connector 64, 64A. Preferably, the cylindrical tube member 146 is made from an insulating material such as, for example, a polymeric material. However, other insulating materials which can be provided in a cylindrical shape and offer a degree of resiliency could also be utilized to form the cylindrical tube member 146.

Also, as shown in FIG. 4, in certain embodiments, a potting layer 148 may be provided over at least a portion of each busbars 58, each terminal connector 64, 64A, 64B and a portion of each conductive wire 66. The potting layer 148 is provided to separate each terminal connector 64, 64A, 64B from the sheet metal 74 that at least partially defines the body opening 24. The potting layer 148 is of a thickness which allows a portion of the potting layer 148 to be disposed over each terminal connector 64, 64A, 64B. The potting layer 148 protects the terminal connectors 64, 64A, 64B from environmental damage and electrically insulates the terminal connectors 64, 64A, 64B from the aforementioned sheet metal. However, it should be appreciated that in certain embodiments (not depicted), for example, when the window assembly is utilized to close a side or rear opening of the vehicle, a potting layer may not be utilized.

When provided, the potting layer 148 is also disposed over the first major surface 34 of the first pane of glass 28. When the potting layer 148 is provided over the first major surface 34 of the first pane of glass 28 as is shown in FIG. 4, the potting layer 148 forms an inboard surface 150 of the window assembly 20 which separates a portion of the first major surface 34 of the first pane of glass 28 from the sheet metal 74 which partially defines the vehicle body opening 24 into which the window assembly 20 is installed. Suitable potting layer materials include acrylics, silicones and urethanes. Other potting layer materials are suitable for use in forming the window assembly.

In certain embodiments, a retaining member 152 may be utilized to prevent the potting layer material from flowing out of the area where it is desired after it is disposed over the first pane of glass 28 and before it hardens. In order to form the window assembly 20, the retaining member 152 is disposed on the first major surface 34 of the first pane of glass 28. In these embodiments, the retaining member 152 may be attached to the first major surface 34 via an adhesive or another method. Preferably, the retaining member 152 is configured to be disposed around each terminal connector 64, 64A, 64B provided. Once the potting layer material has been provided over each terminal connector 64, 64A, 64B, the potting layer material is contained by the retaining member 152. After the potting material hardens, the retaining member 152 may in remain in place such that the retaining member 152 is disposed around the potting layer 148 or may be removed from the first major surface 34 of the first pane of glass 28 and reused.

The molding member 72 is disposed around at least a portion of the peripheral edge 32 of the window assembly 20. As illustrated in FIG. 4, a portion of the retaining member 152 may separate the potting layer 148 from the molding member 72. Preferably, the molding member 72 is formed from a polymeric material that can be molded onto or otherwise affixed around the peripheral edge 32 of the window assembly 20. The molding member 72 provides a seal about the body opening 24 of the vehicle 22 that the window assembly 20 is installed in. The molding member 72 may be disposed against a water box cover 154 when the window assembly 20 is installed in the body opening 24. In order to achieve an aesthetic appearance, there is very little space left between the molding member 72 and the aforementioned sheet metal 74. Nonetheless, it is desirable to utilize the space 70 to, for example, provide an electrical connection therethrough.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

LIST OF REFERENCES

20 Window assembly
22 Vehicle
24 Body opening (of the vehicle)
26 Polymeric interlayer
28, 30 Pane of glass (first, second)
32 Peripheral edge (of the window assembly)
34, 38 Major surface (of the first pane of glass)
36, 40 Major surface (of the second pane of glass)
42 Wiper rest area
44, 46 Edge portions (of the window assembly)
48 Conductive traces
50, 52 Edge portions (of first or second pane of glass)
54, 56 Grid-like patterns (for heating a wiper rest area)
58 Busbar
60 Wire assembly
62 Wire connector
64, 64A, 64B Terminal connector (first and second)
66 Conductive wire
68, 68A, 68B, 68C Solder
70 Space (around a molding member)
72 Molding member
74 Sheet metal
76 Insulating sheath
78 Exposed portion (of the conductive wire)
80, 82 Female, male-ended portion (of the terminal connector)
84 Portion (of the lower edge)
86 Lower edge (of the first pane of glass)
88, 90 End (of the terminal connector)
92, 94 Side (of the terminal connector)
96, 96A, 96B Upper portion (of the terminal connector)
98A, 98B End (of upper portion)
100, 100A, 100C Base portion (of the terminal connector)
102 Sidewall (of the terminal connector)
104, 106 Rounded portion (of the terminal connector)
108 First surface (of the base portion)
112, 114 End (of the base portion)
116, 118 Side (of the base portion)
120, 122, 124, 126 Edge (of the first surface)
128 Center portion (of the first surface)
130, 132 First and second edge portions (of the first surface)
134 Curved portion (of the center portion)
136 Remaining portion (of the center portion)
138 Second surface (of the base portion)
140 Opening (in the base portion)
142 Body portion (of the terminal connector)
146 Cylindrical tube member
148 Potting layer
150 Inboard surface (of the window assembly)
152 Retaining member (for potting material)
154 Water box cover
L, T, W Length, Thickness, Width (of the terminal connector)

The invention claimed is:

1. A window assembly, comprising a first pane of glass; a first terminal connector in mechanical communication with the first pane of glass, the first terminal connector having a base portion that comprises a first surface which faces a major surface of the first pane of glass, the first surface being separated from the major surface of the first pane of glass by solder and comprising a center portion provided between a first edge portion and a second edge portion, wherein the first edge portion extends from an edge of the first surface to the center portion and the second edge portion extends from an opposite edge of the first surface to the center portion, the center portion being nearer the major surface of the first pane of glass than the first edge portion and the second edge portion and, wherein the center portion comprises a curved portion which is nearer the major surface of the first pane of glass than a remaining portion of the center portion, wherein the solder separating the curved portion from the major surface of the first pane of glass is of a thickness which is less than a thickness of the solder separating the remaining portion of the center portion from the major surface of the first pane of glass.

2. The window assembly of claim 1, wherein the first edge portion and the second edge portion are each provided in an oblique relationship with the major surface of the first pane of glass.

3. The window assembly of claim 1, wherein the first edge portion and the second edge portion are each sloped with respect to the major surface of the first pane of glass.

4. The window assembly of claim 1, wherein the solder separating the first edge portion and the second edge portion from the major surface of the first pane of glass is of a thickness which is greater than a thickness of the solder separating the center portion from the major surface of the first pane of glass.

5. The window assembly of claim 1, wherein the curved portion is the portion of the first surface which is closest to the major surface of the first pane of glass.

6. The window assembly of claim 1, wherein the solder is lead-free.

7. The window assembly of claim 1, wherein the curved portion comprises a radius of curvature of 6.0-25.4 mm.

8. The window assembly of claim 1, wherein the curved portion extends in a direction which is generally parallel to a portion of the lower edge of the first pane of glass.

9. The window assembly of claim 1, wherein the center portion separates the first edge portion from the second edge portion.

10. The window assembly of claim 1, further comprising a second terminal connector which is in a spaced apart relationship with the first terminal connector.

11. The window assembly of claim 1, wherein the first terminal connector is in a spaced apart and parallel relationship with a portion of the lower edge of the first pane of glass.

12. The window assembly of claim 1, further comprising a wire assembly which includes a conductive wire having a portion covered by an insulating sheath and an exposed portion not covered by the insulating sheath, the first terminal connector being attached to the exposed portion.

13. The window assembly of claim 1, wherein the first terminal connector is of a thickness (T) 2 mm or less, a length (L) 6 mm or less, and a width (W) 6 mm or less.

14. The window assembly of claim 1, further comprising a retaining member disposed around a potting layer, which is provided over the first terminal connector, and a polymeric interlayer provided between the first pane of glass and a second pane of glass, wherein a busbar is disposed on the major surface of the first pane of glass and the first terminal connector is in electrical communication with the busbar via the solder.

15. The window assembly of claim 1, wherein the first terminal connector is provided in mechanical communication with the first pane of glass via resistance soldering.

16. The window assembly of claim 14, wherein the first pane of glass and the second pane of glass are each of a thickness of 3 mm or less.

17. A window assembly, comprising:
a first pane of glass;
a first terminal connector in mechanical communication with the first pane of glass; and
a wire assembly which includes a conductive wire having a portion covered by an insulating sheath and an exposed portion not covered by the insulating sheath, the first terminal connector being attached to the exposed portion, the first terminal connector having a proximal edge portion from which the portion of the conductive wire covered by the insulating sheath extends from the first terminal connector and a distal edge portion opposite the proximal edge portion;
wherein the first terminal connector includes a base portion that comprises a first surface which faces a major surface of the first pane of glass, the first surface being separated from the major surface of the first pane of glass by solder and comprising a center portion extending between the proximal edge portion and the distal edge portion, the center portion being nearer the major surface of the first pane of glass than the proximal edge portion and the distal edge portion, wherein the center portion comprises a curved portion which is nearer the major surface of the first pane of glass than a remaining portion of the center portion, and wherein the solder separating the curved portion from the major surface of the first pane of glass is of a thickness which is less than a thickness of the solder separating the remaining portion of the center portion from the major surface of the first pane of glass.

18. A window assembly, comprising:
a first pane of glass;
a first terminal connector in mechanical communication with the first pane of glass; and
a wire assembly which includes a conductive wire having a portion covered by an insulating sheath and an exposed portion not covered by the insulating sheath, the first terminal connector being attached to the exposed portion;
wherein the first terminal connector includes an upper portion separated from a base portion by the exposed portion of the conductive wire;
wherein the upper portion of the first terminal connector comprises a first upper portion member having a first end and a second upper portion member having a second end, the first and second ends being adjacent one another;
wherein the base portion comprising a first surface which faces a major surface of the first pane of glass, the first surface being separated from the major surface of the first pane of glass by solder and comprising a center portion provided between the proximal edge portion and the distal edge portion, the center portion being nearer the major surface of the first pane of glass than the proximal edge portion and the distal edge portion; and
wherein the center portion comprises a curved portion which is nearer the major surface of the first pane of glass than a remaining portion of the center portion, and wherein the solder separating the curved portion from the major surface of the first pane of glass is of a thickness which is less than a thickness of the solder separating the remaining portion of the center portion from the major surface of the first pane of glass.

19. The window assembly of claim 12, wherein the first terminal connector has a thickness, determined after the terminal connector has been attached to the conductive wire, in the range of from 1.5 mm or more to 2 mm or less.

* * * * *